United States Patent [19]

Freeman et al.

[11] Patent Number: 5,129,076
[45] Date of Patent: Jul. 7, 1992

[54] OPTICAL DISK LIBRARY CONTROL SYSTEM PROVIDING AN ENHANCED INITIALIZATION TECHNIQUE

[75] Inventors: Harrison L. Freeman, Kasson; Richard G. Mustain, Rochester; Carol A. Peters, Byron; Thomas M. Hoag, Rochester, all of Minn.

[73] Assignee: International Business Machines Corporation, Armonk, N.Y.

[21] Appl. No.: 325,578

[22] Filed: Mar. 20, 1989

[51] Int. Cl.⁵ .............................................. G06F 13/00
[52] U.S. Cl. .................................... 395/425; 360/92; 364/DIG. 1
[58] Field of Search ............... 364/200, 900; 360/92; 395/425

[56] References Cited

U.S. PATENT DOCUMENTS

| | | | |
|---|---|---|---|
| 4,310,883 | 1/1982 | Clifton et al. | 364/200 |
| 4,928,245 | 5/1990 | Moy et al. | 364/513 |
| 4,945,428 | 7/1990 | Waldo | 360/92 |
| 4,987,533 | 1/1991 | Clark et al. | 364/200 |

OTHER PUBLICATIONS

Acerson, Karen L., *Word Perfect* ® *The Complete Reference*, Rename and Save Functions, 1988.

*Primary Examiner*—Michael R. Fleming
*Assistant Examiner*—Glenn A. Auve
*Attorney, Agent, or Firm*—Hugh D. Jaeger

[57] ABSTRACT

A method of and apparatus for automatically assigning a name to a storage file. This assignment technique is particularly pertinent to storage files used in conjunction with an optical storage system. The automatically assigned name is used throughout the system to identify the storage file for all purposes including loading and unloading the storage file to and from the various drives within the system, initializing the storage file for use, and reading and writing to and from the storage file. Automatic name assignment normally occurs when a storage file is placed within a mass storage library. A name becomes necessary at that time because the storage file is then available to the system. Alternate automatic name assignment also occurs when for any reason the system is unable to read the name written on a storage file. The automatically asigned name may be replaced with a user supplied name upon operator request.

8 Claims, 10 Drawing Sheets

100 — VOLUME LOCATION TABLE

| 102 NAME | 104 TYPE | 106 STATUS | 108 SUBSYSTEM | 110 LIBRARY BIN | 112 DRIVE |
|---|---|---|---|---|---|
| 114 | 116 | 118 | 120 | 122 | 124 |

FIG.4

130 — BIN TABLE

| 132 LIBRARY BIN | 134 F/E | 136 NAME(SIDE 1) | 138 NAME(SIDE 2) | 140 STATUS |
|---|---|---|---|---|
| 142 | 144 | 146 | 148 | 150 |

FIG.5

160 — DRIVE TABLE

| 162 DRIVE | 164 F/E | 166 FILE NAME(SIDE 1) | 168 FILE NAME(SIDE 2) | 178 STATUS |
|---|---|---|---|---|
| 170 | 172 | 174 | 176 | 180 |

FIG.6

OPTICAL DISK LIBRARY CONTROL SYSTEM PROVIDING AN ENHANCED INITIALIZATION TECHNIQUE

TECHNICAL FIELD

The subject invention relates generally to the control system for mass storage devices for data processing systems, and more particularly, the aspect of the control system which assigns identifying names to individual storage elements and tracks their position and use within a data processing system.

BACKGROUND ART

The use of mass storage systems is as old as the use of the general purpose, stored program, digital computer. Early technologies involved magnetic drum and magnetic tape. Subsequently, magnetic disk systems of various types found widespread usage. The hardware and software of these mass storage systems are typically designed to expect a unique volume name for each defined volume within the mass storage system. This commonly takes the form of a volume name which identifies a particular magnetic tape or magnetic disk or a specific, identifiable portion thereof.

The volume name written on the mass storage medium is also written into the system storage tables. The system storage tables are used to track the location of a particular volume. An entry exists in the tables specifying the current storage bin or drive that contains a given volume. In this way, the operator and the system can each use a single volume name to identify a specific mass storage volume. In most systems, failure of the operator and/or the system to so identify a storage volume (e.g., read errors, table errors, operator errors, etc.) results in an inability to access that storage volume.

As an alternative to a name which is available to both the system and the operator, some prior art control systems developed names which are used by the system, but which are unavailable to the operator. Typically, in such an instance, the system automatically assigns a name to volumes which are to be accessed by the system, but which are not intended to be directly accessed by the operator. This approach may be adequate where the physical structure of the storage system remains unchanged. That is, systems which do not accommodate physical addition, removal or substitution of storage media such as disks or tape cassettes. However, in the situation where individual media devices, for example disks, may be repositioned, removed or added to a storage system, it is desirable that the system and the operator both have knowledge of the volume name assigned to the storage device (disk).

The identification of individual replaceable storage elements is particularly significant in a mass optical storage device which contains multiple optical volumes (disks) that must be entered into the storage system control before they can be made ready for use by the optical subsystem. In order to identify and track a volume in the system, it must have a name assigned.

It is beneficial to be able to accommodate the existence of volumes in the system without specifically assigning a name. There are also times when an assigned name of a volume becomes unknown even though the volume is physically located in the system.

For example, when a drive is allocated for a volume being entered into the system, the name may be unknown prior to the time that the label is read. Also, in the situation where the volume entered has not yet been initialized, a name is usually not assigned to it. Another such case arises when a dual-sided volume is entered into a library entry slot for the first time. In this case, even though one side of the volume may be identified, the opposite side is unknown. If a duplicate name for the volume is found to already exist in the system, the name cannot be used. If a read error occurs in the label sector of the volume, the name may be assigned but cannot be determined by the system.

These problems are particularly troublesome in the case of optical storage disks which are capable of handling far more data than comparable magnetic storage disks.

DISCLOSURE OF THE INVENTION

It is therefore an object of the invention to provide a control system for an optical storage subsystem which accommodates the unique requirements of optical storage disks in a library environment.

It is another object of the invention to provide an optical storage subsystem control which accommodates the presence of optical disks which have not been initialized or on which the name may be unreadable, previously assigned, or not yet read by the system.

Still another object of the invention is to provide a control system for an optical storage subsystem of the disk library type.

It is still another object of the invention to provide a control system for a library type storage subsystem which assigns disk volume names in a fashion which ensures unique disk volume names for each disk.

These and other objects of the invention are accomplished by a control system which routinely assigns a name to a storage disk immediately upon placing the physical medium into a library bin. This automatically assigned name may be later changed by reading an earlier assigned name from the disk itself or by operator entry of a user name. Until either of these events occur, the automatically assigned name will be used as the volume name for the storage disk for all system purposes. Alternatively, a name may be automatically assigned if a previously assigned name cannot be read from the storage medium.

This permits volumes to reside in the optical storage system prior to use and initialization. It gives a means of tracking volumes whose names have been lost or not yet assigned.

In order to enter the volume into the dynamic tracking tables, a unique name is required. This invention generates a unique name for the volume during the time that a user-assigned name is unknown. It provides a user-friendly way of entering a dual-sided platter into a library system, which allows the user to easily initialize each of the two volumes at any convenient time. It also provides a way to reject a platter that cannot be used because of bad media on both sides (i.e., both volumes), thus saving time and space occupied by the platter. With the system-generated names, a volume may be used (i.e., read from and written to) before the opposite side is initialized.

Volumes are tracked as they move through the system with several tables. The name of the volume is its means of being identified. The following tables are used to track the volumes as they are moved around within the system.

1. A volume location table with an entry for every known volume. This table resides in permanent storage. Information is kept on the volume's status, table of contents, type and its current as well as its next location. If the current location is a drive, the table indicates whether the volume faces the read/write head.

2. A bin table with an entry for each library bin which holds a platter. This table keeps information about the volumes (one on each side of the platter) such as its name, status information and next available write address.

3. A drive table with an entry for each drive in the system. This table keeps information about the status of the drive, current use of the drive and the volumes mounted.

The tables described above are dynamic to accommodate volume movement in and out of drives and/or bins. The information is updated as the volumes are relocated.

BRIEF DESCRIPTION OF THE DRAWINGS

FIG. 4 shows a typical layout for a volume location table.

FIG. 5 shows a typical layout for a bin table.

FIG. 6 shows a typical layout for a drive table.

DESCRIPTION OF THE INVENTION

Figure 1:
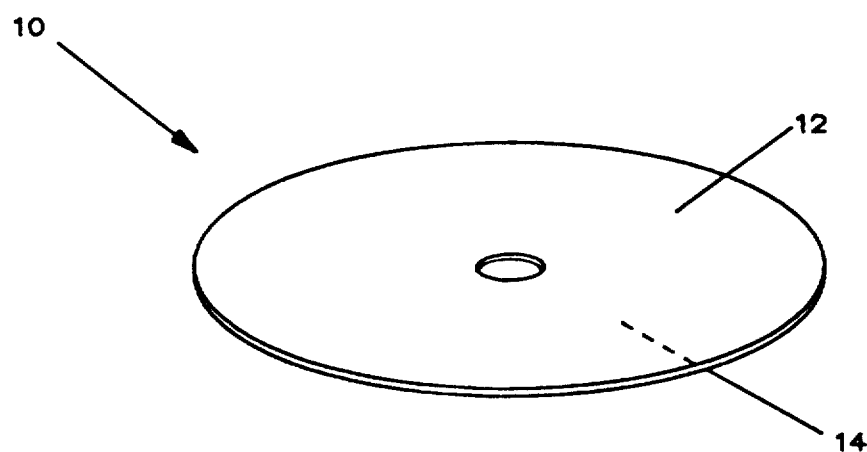
FIG. 1 is view of a dual-sided optical storage disk.

FIG. 1 is a view of a dual-sided optical storage disk 10. It is similar to the well-known compact audio disk constructed of materials and in a manner known in the art, and readily available for purchase commercially. It has a diameter which is large in relation to its thickness. Dual-sided optical storage disk 10 has the capability for data recording on flat circular surface 12 and also on flat circular opposing surface 14. Each surface (i.e., 12 and 14) is individually accessible for reading and writing and each is treated as a separate, independent storage volume.

Figure 2:
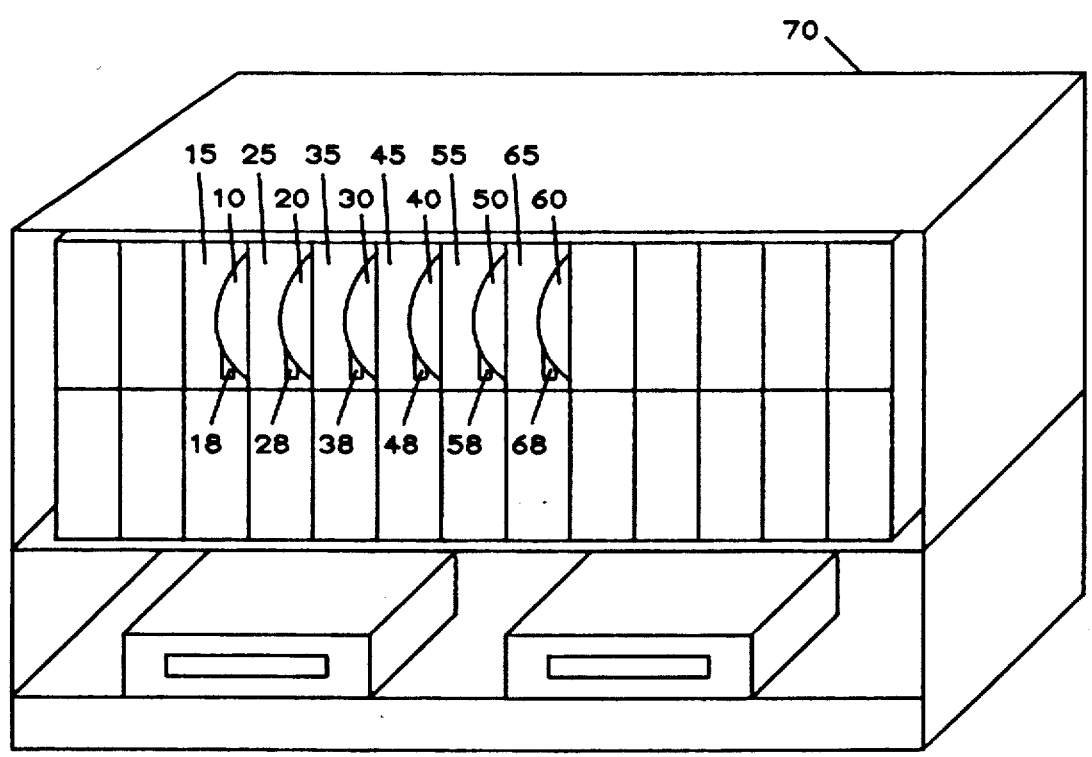
FIG. 2 is a conceptual view of an optical storage library showing a plurality of optical storage volumes.

FIG. 2 is a conceptual view showing a library 70 within an optical storage system. Library 70 is shown to contain a plurality of library entry slots 15, 25, 35, 45, 55 and 65. Each of these library entry slots accommodates an individual optical storage disk 10, 20, 30, 40, 50 and 60. In addition to other features of library 70, each of library entry slots 15, 25, 35, 45, 55 and 65 includes sensing means 18, 28, 38, 48, 58, and 68 for sensing whether that library entry slot contains an optical storage disk. The sensing means 18, 28, 38, 48, 58 and 68 include means to notify a system controller of the presence of an optical storage disk.

Figure 3:
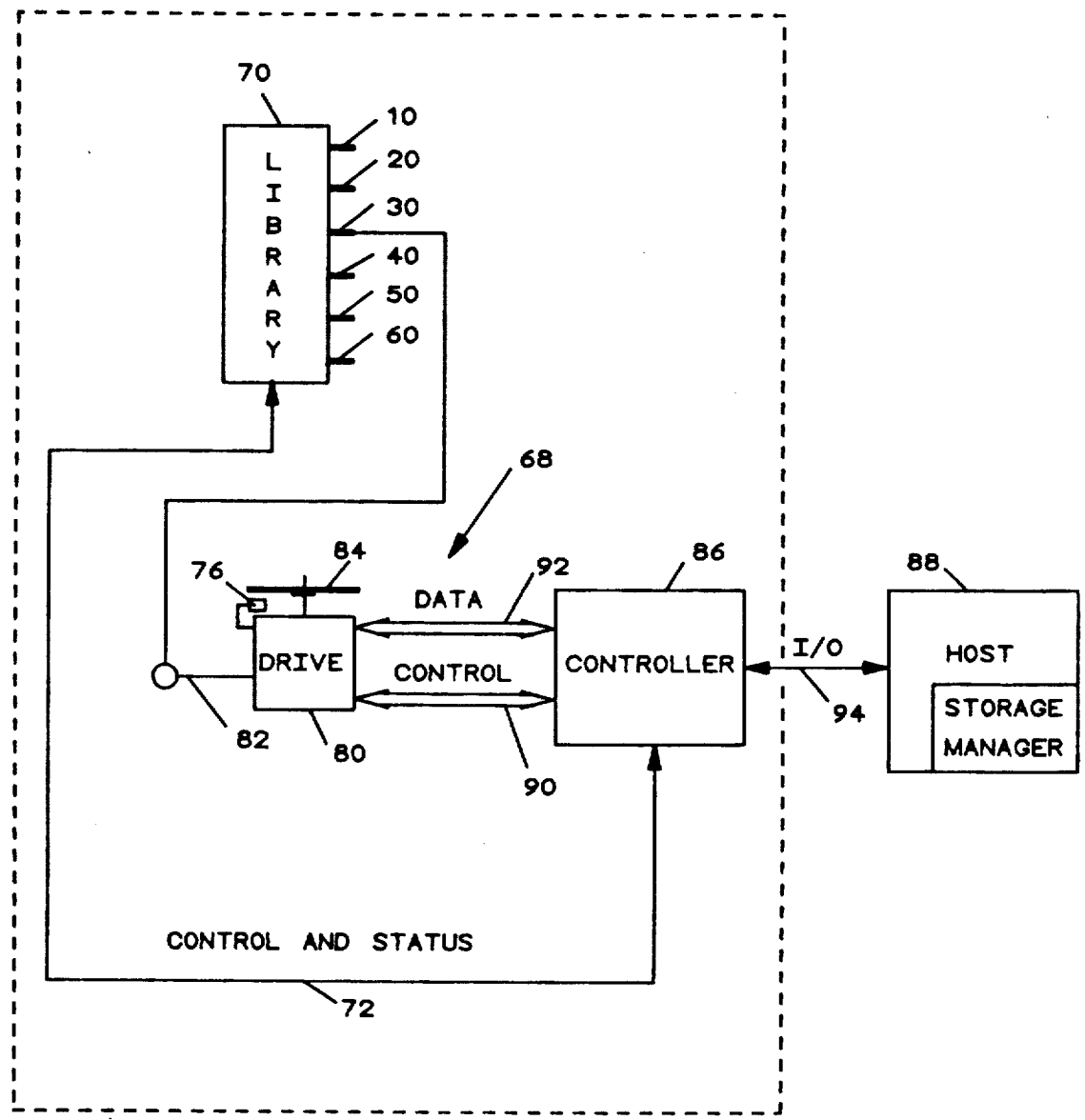
FIG. 3 is a schematic view of an optical storage library as coupled to a host computer.

FIG. 3 is a schematic view of the entire optical storage system 68 coupled via I/0 cable interface 94 to host computer 88. Library 70 is shown in a normal operating position. As explained above, it contains optical storage disks 10, 20, 30, 40, 50 and 60. The sensors 18, 28, 38, 48, 58 and 68 in each of the library entry slots 15, 25, 35, 45, 55 and 65 notify controller 86 of the presence or absence of an optical storage disk in the corresponding library bin over control and status cable 72. Controller 86 in turn notifies host computer 88 as to which library bins contain optical storage disks via normal I/O cable interface 94.

Read and write operations are performed by drive 80. A given subsystem may contain more than one drive. When controller 86 receives a command to load a particular optical storage disk via I/O cable interface 94, it directs drive 80 to conduct the load via control cable 90. Drive 80 extracts the desired optical storage disk 30 from the corresponding library entry slot in library 70 using a robotic gripper arm 82. The relationship between the desired optical storage disk and the corresponding library entry slot is explained below. The selected optical storage disk is then placed upon read/write turntable 84 by robotic gripper arm 82. In a similar manner robotic gripper arm 82 may remove an optical storage disk and return it to the designated library entry slot.

After being placed upon read/write spindle 84, the selected optical storage disk may be accessed for both reading and writing by optical access head assembly 76 in the manner well known in the art. Specific read and/or write commands are issued by host computer 88 via I/O cable interface 94 to controller 86. These commands are translated and sent to drive 80 via control cable 90. DatA which is read or written is transferred between controller 86 and drive 80 via data cable 92. Read/write data is transferred between host computer 88 and controller 86 via I/O cable interface 94 in the normal manner. Host computer 88 contains storage manager 96 which contains the software for managing optical storage system 68.

The system uses various data tables located within storage manager 96 to maintain the data necessary to track the optical storage system. FIGS. 4, 5, and 6 show the conceptual construction and operation of the three significant tables.

FIG. 4 depicts volume location table 100. It maintains a record of each optical storage disk known to the system by each volume (i.e., each storage surface or side). Volume location table 100 will have a variable number of entries. Name column 102 lists the name of each such volume known. This list will contain user-assigned names and names which are automatically assigned by the system as discussed below.

Typical data stored in relation to the name of each known volume is contained in representative columns; type 104, status 106, subsystem 108, library bin 110 and drive 112. Type column 104 indicates whether the corresponding name in name column 102 was automatically assigned by the system or was user-assigned. Status column 106 indicates whether or not the corresponding volume is available for reading only, reading and writing, or whether it is defective, and therefore, available for neither. Subsystem column 108 indicates to which optical storage subsystem or library each volume is assigned, if any. Library bin column 110 indicates the relevant library entry slot, if any. Drive column 112 indicates to which drive, if any, a given volume is assigned.

For any given entry 114 in name column 102, there is a corresponding entry 116 in type column 104, a corresponding entry 118 in status column 106, a corresponding entry 120 in subsystem column 108, a corresponding entry 122 in library bin column 110, and a corresponding entry 124 in drive column 112.

FIG. 5 depicts the conceptual layout of bin table 130. There is a separate bin table 130 for each library unit within the system although in practice, these are simply written consecutively. Bin table 130 maintains a record of the volume(s) assigned to each library bin within the library. Library bin column 132 simply lists each library bin sequentially. The bin table 130 will have a fixed number of entries. Therefore, as a matter of construction efficiency, library bin column 132 may only exist as a fixed relationship between the storage location of each of its corresponding data sets, rather than the separate column of data which is shown for the purpose of illustrating the operation of bin table 130.

For each library bin, there is a corresponding designation in F/E column 134 indicating whether an optical storage disk is or is not present within that library bin. Name (side 1) column 136 and name (side 2) column 138 provide the names corresponding to each volume for each optical storage disk physically assigned to each library bin. As with entries in name column 102 of volume location table 100 (see FIG. 4), entries in name (side 1) column 136 and in name (side 2) column 138 may be either automatically assigned by the system or user assigned. Status column 140 provides additional information concerning the status of each library bin (i.e., whether the contents of that library bin has been assigned to a drive).

For each entry 142 in library bin column 132, there is a corresponding entry 144 in F/E column 134, a corresponding entry 146 in name (side 1) column 136, a corresponding entry 148 in name (side 2) column 138, and a corresponding entry 150 in status column 140.

FIG. 6 conceptually depicts the contents and operation of drive table 160. This table describes the status of the optical storage volume present, if any, on a given drive. There exists a separate entry in drive table 160 for each drive within the system. Drive column 162 lists each drive. F/E column 164 describes whether a corresponding drive does or does not contain an optical storage disk. File name (side column 166 provides the automatically assigned or user-assigned name for one side of each storage volume currently available for access on each drive. The file name for the opposite side of the storage disk is found in file name (side 2) column 168. Status column 178 gives the current operability status of each drive in the system. For each drive in the system there is a corresponding entry 170 in drive column 162, a corresponding entry 172 in F/E column 164, a corresponding entry 174 in file name (side 1) column 166, a corresponding entry 176 in file name (side 2) column 168, and a corresponding entry 180 in status column 178.

Having thus described the three major tables containing the names of the various optical storage volumes known to the system, the method of maintaining these tables will next be described in relation to the conceptual flowcharts depicted in FIGS. 7-13.

Figure 7:
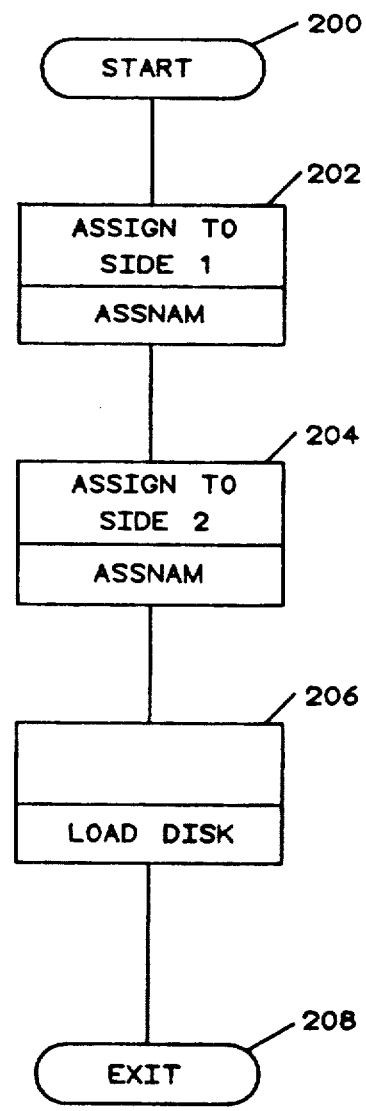
FIG. 7 is a flowchart of a procedure for assignment of a file name to an optical storage volume.

FIG. 7 shows the way in which optical storage volumes become known to the system, and therefore, are assigned names automatically by the system. The system enters the assignment procedure at element 200. This may be via operation of a single processor in single processor systems, or it may represent control of one of the processors in a multiple processor environment. In either case, an individual sensor detects the insertion of a particular optical storage disk into the library entry slot. This is communicated from library 70 to controller 86 via control and status cable 72 and subsequently from controller 86 to storage manager 96 of host computer 88 via normal I/O cable interface 94 as discussed above (see FIG. 3).

Element 202 calls procedure ASSNAM to automatically assign a unique system name to the first side of the storage disk as described below. Similarly, ASSNAM is again called by element 204 to assign a name to the volume on the opposite side. Procedure LOADDISK is called by element 206. LOADDISK mounts the volume on a drive and updates the tables. SPECNAM actually initializes the volume when the user specifies a name. This is illustrated by the element 244 of FIG. 8. The tables are also updated as described. Element 208 exits the procedure.

Figure 8:
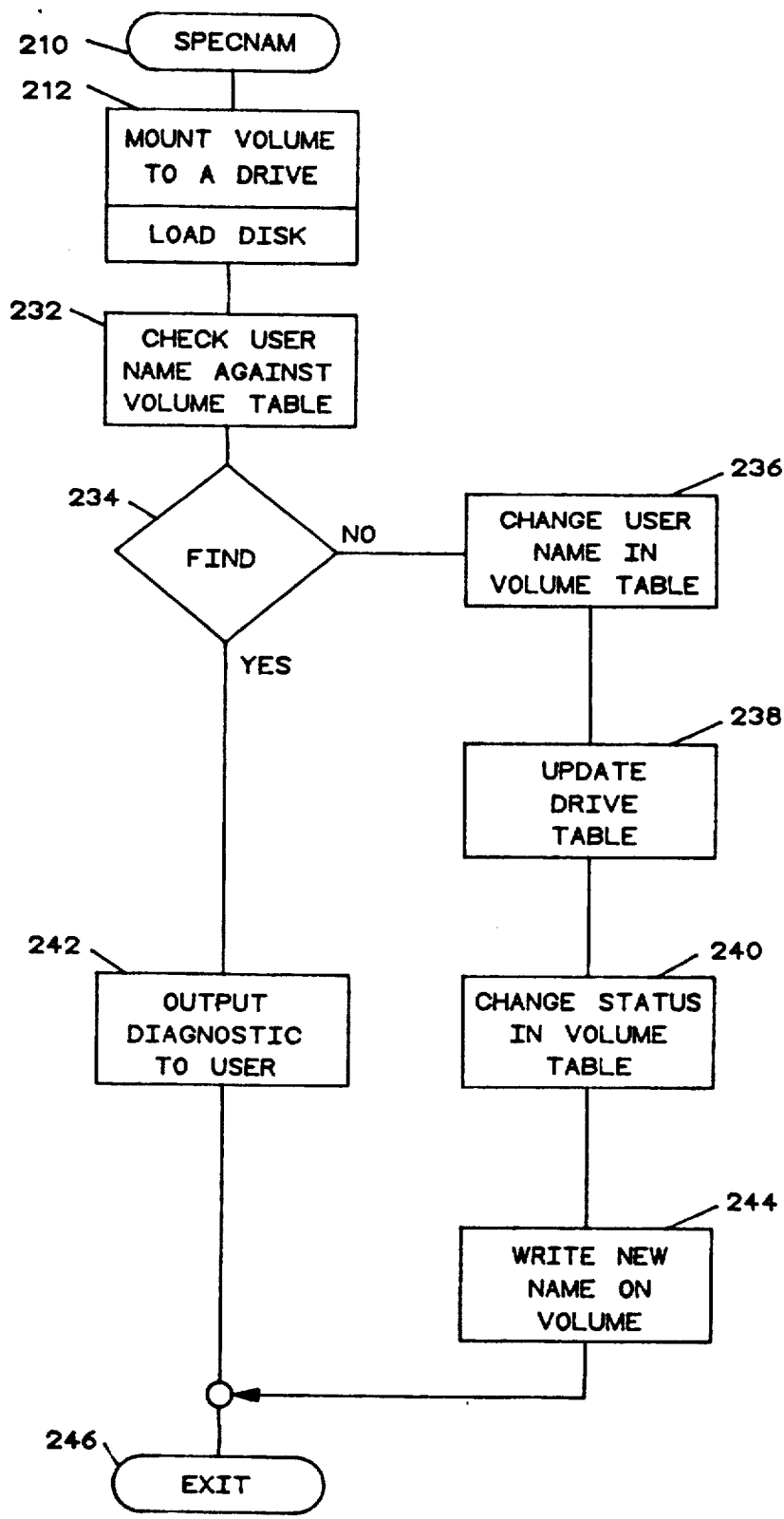
FIG. 8 is a flowchart of procedure SPECNAM.

Procedure SPECNAM is conceptually described by the flowchart of FIG. 8. Procedure SPECNAM processes a user-assigned name. The procedure is entered at element 210. A check is made at element 232 by comparing the new user assigned name to the contents of name column 102 of volume table 100. This check is to ensure that the assignment of duplicate names to different optical storage volumes is not permitted. If a match is not found, element 234 routes control to element 236 which actually changes the name in name column 102 of volume table 100 (see also FIG. 4) to the new user-assigned name. The corresponding field in type column 104 is also updated to indicate a user-assigned name. Element 238 updates name column 162 of drive table 160. Similarly, the corresponding entries in status column 106, subsystem column 108, and library bin column 110 are simply updated by element 240 to reflect the new name of the storage volume in the system and its possible new location. Element 244 writes the new user assigned name to the volume.

If element 234 finds the user-assigned name to be a duplicate, it is because the name corresponds to an optical storage volume present in another library bin. Element 242 outputs a diagnostic to the operator to notify the error. Since the system has already assigned a name, procedure ASSAM is not called.

Figure 9:
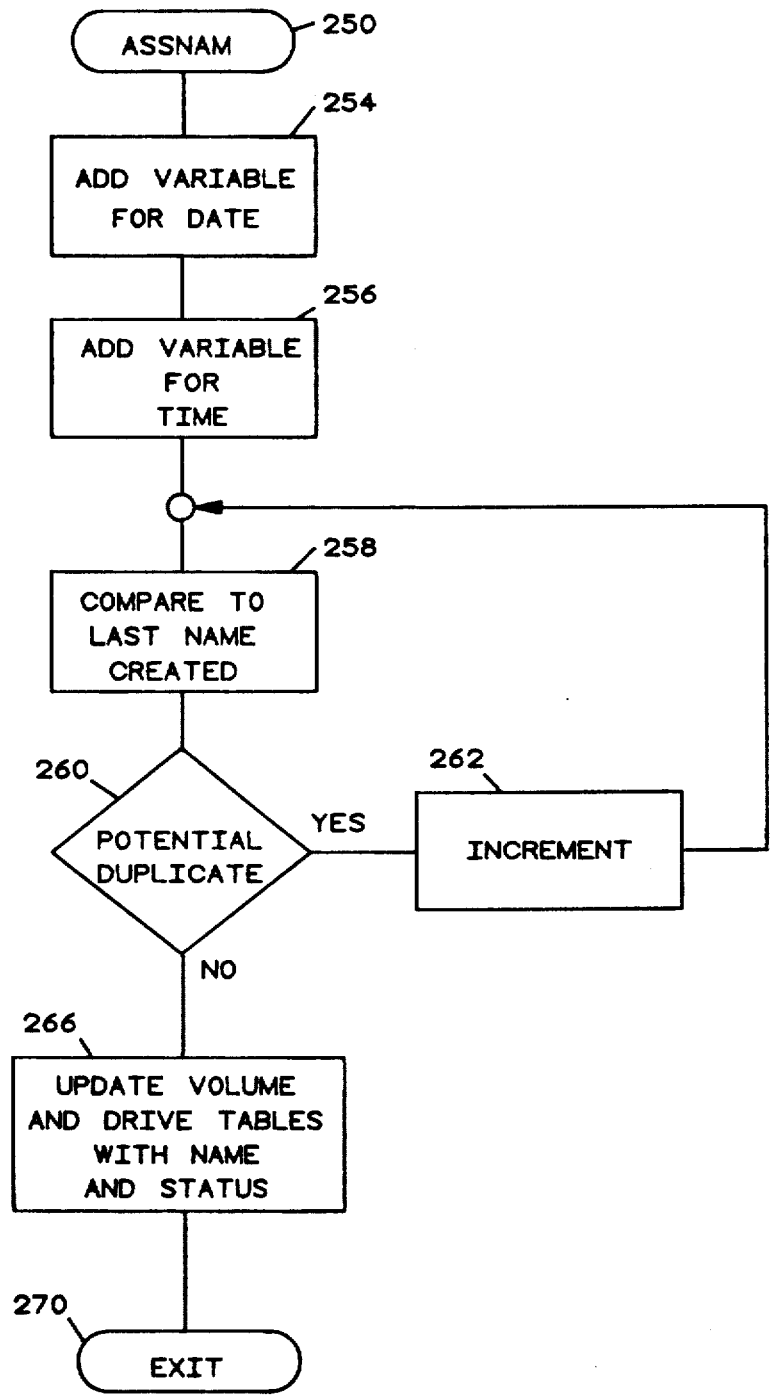
FIG. 9 is a flowchart of procedure ASSNAM.

Procedure ASSNAM is depicted conceptually by the flowchart of FIG. 9. The procedure is entered at element 250. Element 254 assigns a variable portion to the name which corresponds to the current date. This is known from the system data tables. Element 256 next adds a uniqueness field which is the current time, also supplied by the associated data processing system. Element 258 compares the newly assembled name to the last name assigned. Element 260 determines if a potential match is possible. If yes, element 262 increments the uniqueness variable field added by element 256.

Once element 260 has verified the uniqueness of the assigned name, element 266 makes the appropriate entries in both volume location table 100 and drive table 160. In addition to the assigned name, the library bin assignment data is also supplied as discussed above. Procedure ASSNAM exits at element 270 and control is returned to the calling program.

Figure 10:
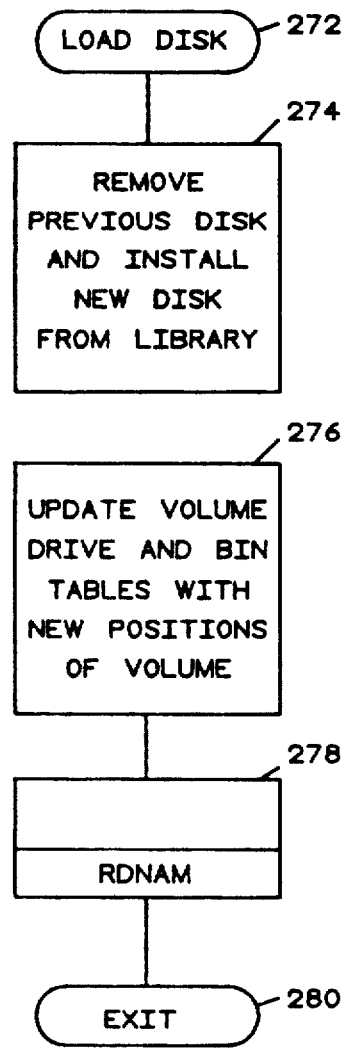
FIG. 10 is a flowchart of procedure LOADDISK.

FIG. 10 is a conceptual flowchart of procedure LOADDISK. This procedure is called in response to a command to load a particular optical storage disk from a particular library bin. The mechanical details of this operation are explained above and are shown conceptually in FIG. 3. Entry to procedure LOADDISK is via element 272.

Element 274 removes any previously loaded disks which may be loaded on the selected drive. This involves such commands as are required to return that previously loaded disk to its corresponding library bin. Volume location table 100, bin table 130, and drive table 160 are all updated for the previously loaded disk to reflect this operation. Similarly, element 274 loads the selected disk from the appropriate library bin to the selected drive. This is a very complex operation, but one which is known in the art in accordance with the preferred mode. Element 276 updates volume table 100, bin table 130, and drive table 160 with the name and location of the newly loaded volume. Procedure RDNAM is called by element 278. This procedure initializes the newly loaded volume and is described in detail below. Exit from procedure LOADDISK is via element 280.

Figure 11:
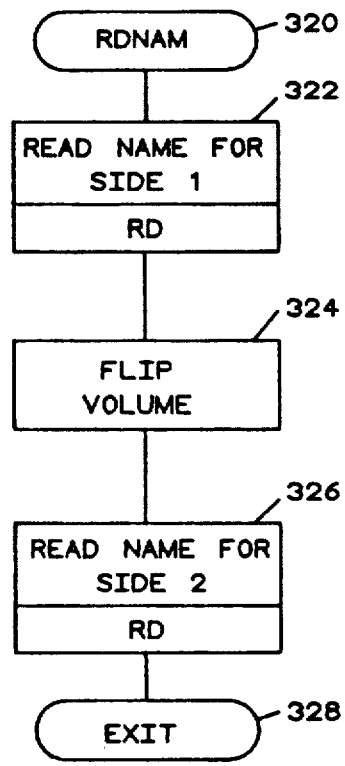
FIG. 11 is a flowchart of procedure RDNAM.

Procedure RDNAM is shown conceptually in the flowchart of FIG. 11. This procedure is called to initialize both sides of the newly loaded disk. The procedure is entered via element 320. Procedure RD is called by element 322 to initialize one side of the disk. Element 324 flips the disk over functionally such that the volume on the opposite side may be initialized. Element 326 again calls procedure RD to initialize the volume on the opposite side. Element 328 provides the exit for procedure RDNAM.

Figure 12:
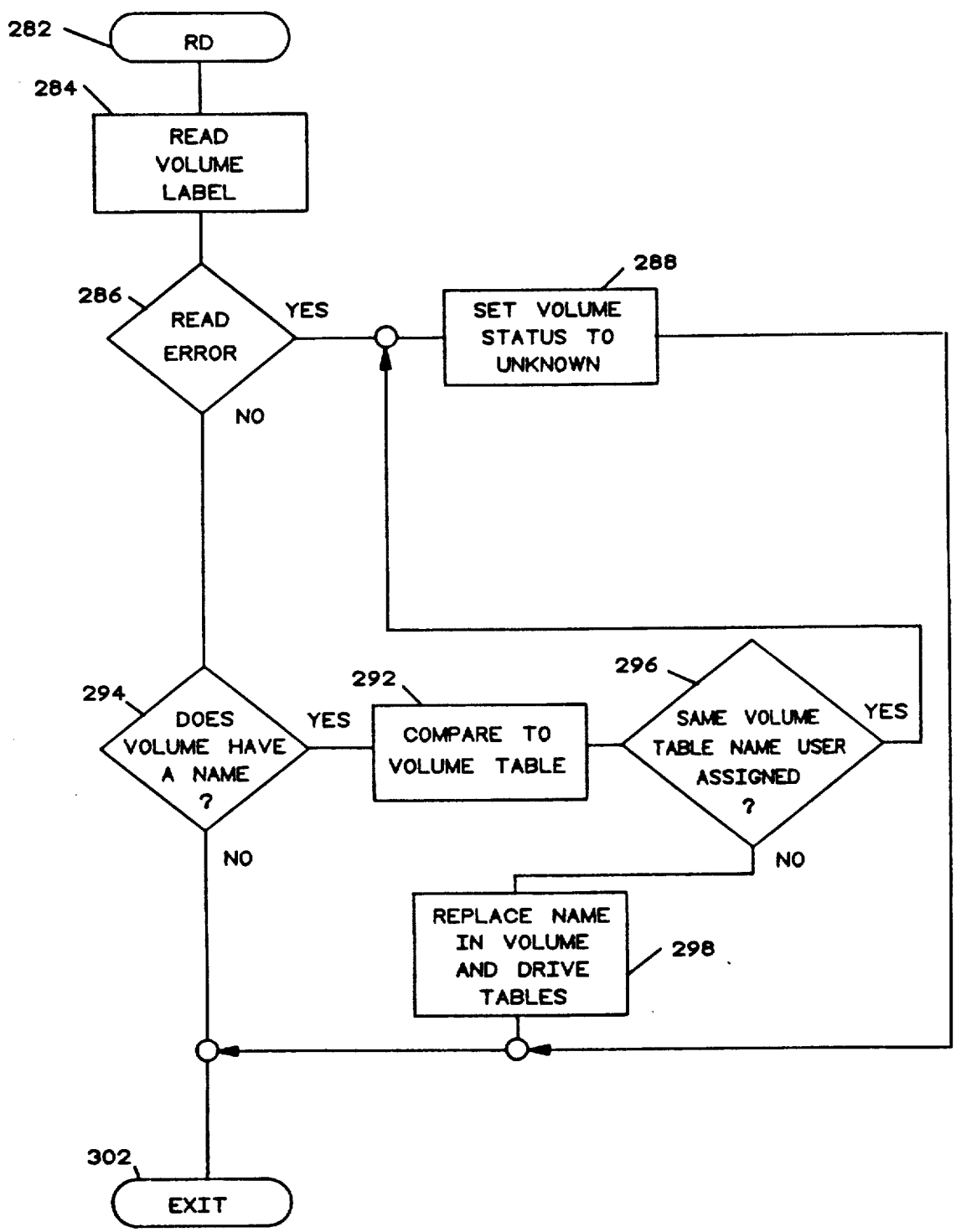
FIG. 12 is a flowchart of procedure RD.

FIG. 12 is a conceptual flowchart for procedure RD. This procedure is used to initialize a single side of an optical storage volume. This procedure is important to the present invention as it is the means whereby an automatically assigned name is replaced with a user-assigned name.

Procedure RD is entered via element 282. Element 284 performs the actual operation to read initialization data from the optical storage volume. Included within this initialization data is the file name if assigned. Again this is a complex operation whose details are known in the art.

Element 286 determines whether a read error has been found. Presence of a read error causes control to be transferred to element 288 which sets the corresponding entry in status column 106 of volume location table 100 to unknown.

If a read error is not found, element 294 determines whether the volume has an assigned name. If yes, the name read from the optical storage volume is compared by element 292 to the expected name in name column 102 of volume location table 100 for the corresponding drive (from drive column 112) and for the corresponding library bin (from library bin column 110). If element 296 finds that the name read from the optical storage volume is the same as the name read from name column 102 of volume location table 100, an error is assumed, and it is treated as a read error. Control is transferred to element 288 to set the corresponding entry in status column 106 of volume location table 100 to unknown.

If element 296 does not find a match between the name read and the names from name column 102 of volume location table 100, the assumption is that the name read from the optical storage volume is the correct one. Therefore, element 298 replaces the automatically assigned system name with the user-assigned name in volume location table 100 and drive table 160. Procedure RD exits at element 302 and control is returned to the calling program.

Figure 13:
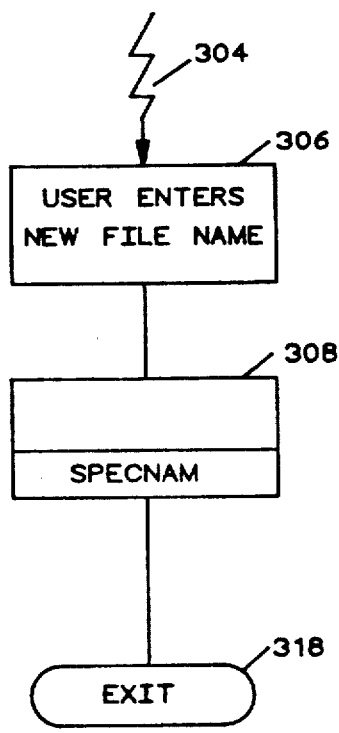
FIG. 13 is a flowchart showing operator entry of a user assigned file name.

The remaining way in which an automatically assigned system name may be replaced with a user-assigned name is by direct operator entry. FIG. 13 is a conceptual flowchart of this process. Because the operator input is asynchronous with system operation, control stream 304 is functionally interrupted by the operator input. Again, this is true whether the interface is polled or operated by priority interrupt. Element 306 represents the I/O from the operator to acquire the user-assigned name. Other data is, of course, required at this time to describe the physical status of the optical storage volume. This may include library bin or drive.

Element 308 calls procedure SPECNAM which makes the name assignment as discussed above. Control is returned to the interrupted program stream via element 318.

It is clear to those skilled in the art that the subject invention may be easily employed from the teaching herein in many embodiments other than this preferred embodiment without departing from the scope of the claims herein attached.

We claim:

1. In a data processing system having a storage subsystem with a library containing a plurality of mass storage disks and with one or more drives, which can access a selected one of said plurality of mass storage disks and having means for writing onto and reading from said one of said plurality of mass storage disks, a control system for said storage subsystem including:
   a. means for automatically assigning a unique system assigned name to each one of said plurality of mass storage disks immediately on insertion of said disk into said library;
   b. means, responsively coupled to said automatically assigning means, for replacing said unique system assigned name with a unique user assigned name; and,
   c. means, responsively coupled to said replacing means, for checking a user assigned name for uniqueness and for preventing said replacing means from replacing said unique system assigned name whenever said user assigned name is not unique.

2. A storage subsystem control system according to claim 1 further including means, responsively coupled to said automatically assigning means, for substituting said unique system assigned name for said unique user-assigned name if said unique user-assigned name cannot be read without error.

3. A system according to claim 1 wherein said means for automatically assigning said unique system assigned name is responsive to a date supplied by said data processing system.

4. A system according to claim 3 wherein said means for automatically assigning said unique system assigned name is further responsive to a time supplied by said data processing system.

5. A data processing system comprising:
   a. a host computer;
   b. a storage controller responsively coupled to said host computer;
   c. a plurality of optical storage disks;
   d. library means for retaining said plurality of optical storage disks;
   e. a drive, responsively coupled to said storage controller and said library means, for accessing a selected one of said plurality of optical storage disks retained in said library;
   f. means, responsively coupled to said host computer and operative immediately upon insertion of a disk into said library, for automatically assigning a unique system name to said last inserted optical storage disk;

g. means, responsively coupled to said host computer and said automatically assigning means, for replacing said unique system name with a user assigned name;

h. means, responsively coupled to said host computer, for checking said user assigned name for uniqueness; and i. means, responsively coupled to said checking means and said replacing means, for inhibiting said replacing means from replacing said unique system name with said user assigned name, whenever said checking means determines that said user assigned name is not unique.

6. A data processing system according to claim 5 further comprising means, responsively coupled to said automatically assigning means, for substituting said unique system name for said user-assigned name if said user-assigned name cannot be read without error.

7. A method of maintaining tables concerning mass storage subsystem within a data processing system having a plurality of mass storage volumes comprising:

a. assigning a unique system name to each mass storage volume available to said mass storage subsystem;

b. replacing said unique system name with a user-assigned name whenever available;

c. verifying uniqueness of a user assigned name whenever available; and, d. preventing replacement of said unique system name by said user assigned name whenever said verifying determines that said user assigned name is not unique.

8. A method according to claim 7 further comprising:

a. reassigning the unique system name to a mass storage volume if said user-assigned name cannot be read without error.

* * * * *